（12）United States Patent
Urban

(10) Patent No.: US 9,213,361 B1
(45) Date of Patent: Dec. 15, 2015

(54) TEMPERATURE SENSOR IN FLEX CIRCUIT

(71) Applicant: Amazon Technologies, Inc., Reno, NV (US)

(72) Inventor: Bradley David Urban, Cupertino, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 239 days.

(21) Appl. No.: 14/030,660

(22) Filed: Sep. 18, 2013

(51) Int. Cl.
*H05K 1/00* (2006.01)
*G06F 1/16* (2006.01)
*G01K 7/02* (2006.01)

(52) U.S. Cl.
CPC . *G06F 1/16* (2013.01); *G01K 7/021* (2013.01)

(58) Field of Classification Search
USPC ............................. 361/749, 679.21, 679.02
See application file for complete search history.

(56) References Cited

U.S. PATENT DOCUMENTS

| 6,027,256 | A  | * | 2/2000 | Nightingale et al. | ............ | 385/92 |
| 6,272,735 | B1 | * | 8/2001 | Moriwake et al. | ............... | 29/612 |
| 2014/0264794 | A1 | * | 9/2014 | Woychik et al. | ............... | 257/668 |

* cited by examiner

*Primary Examiner* — Andargie M Aychillhum
(74) *Attorney, Agent, or Firm* — Seyfarth Shaw LLP; Ilan N. Barzilay; Brian L. Michaelis

(57) ABSTRACT

A computing device and method including a thermal sensor positioned on a flexible circuit located in close proximity to the device enclosure or hot-spot to most accurately track and control skin temperature of the electronic device. One or more flexible circuits may be implemented to include one or more low profile temperature sensors specifically located to detect temperature in close proximity to the enclosure and/or components of interest or hot spots which may be more accurately monitored by locating the low profile temperature sensor on the flexible circuit within the enclosure without substantially increasing the z-height of the existing flexible circuits or taking up additional room within the enclosure.

17 Claims, 6 Drawing Sheets

TEMPERATURE SENSOR IN FLEX CIRCUIT

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the capabilities of such devices increases, packaging the internal circuitry and components becomes a critical issue, and the room within the form factors for such devices becomes increasingly scarce.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

User experience with handheld computing devices continues to grow, as does the quantity and availability of electronic media content for use with such computing devices. Most devices are touch screen enabled electronic devices so users spend a substantial amount of time holding their devices. The touch screen often displays a graphical user interface which includes icons or other graphical elements with which a user may interact. With the increase in the capabilities of such devices and the issues of packaging more internal circuitry comes an issue of heat within the enclosure and perceptible temperature levels of the outer enclosure or "skin temperature." The outside temperature of the handheld device is a significant ergonomic issue.

It is presently known to use a temperature sensor located on a printed circuit board (PCB) to estimate the temperature of the enclosure of the device. Currently, virtually all temperature monitoring of the computing device is done using a thermal-sensing device, such as a thermistor, on the PCB. Such measurement, however, can only provide an estimate of temperature "hot-spots" within the computing device, and does not provide a good measurement of surface or skin temperature perceptible by a user holding the computing device. The PCB mounted temperature sensor may be located in the vicinity of components that sporadically run hot, such as a Central Processor Unit (CPU), but how much of that heat is felt at the enclosure is not readily known. Some CPUs even provide on-board temperature sensing, but again those sensors, to the extent they are accurate over time, merely provide an indication of the temperature of the CPU device and some circuitry in very close proximity. As used herein, the term PCB refers to a rigid circuit board that is not flexible and includes circuitry or electrical components for use in a computing device. A PCB is distinguished from a flexible circuit board, also called a flex, flexible circuit, flexible printed circuit, flex circuit, or flex cable, which is a flexible surface that includes circuitry or electrical components for use in a computing device.

Figure 1A:
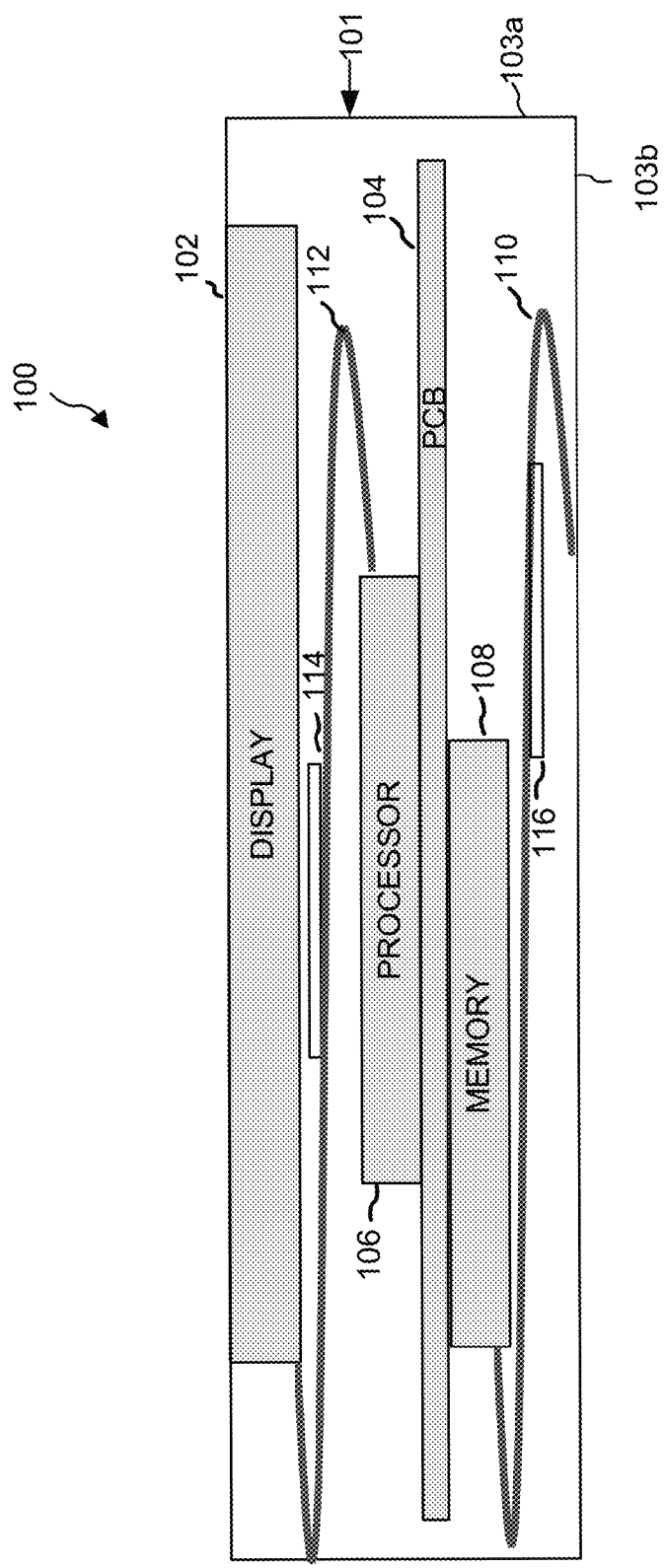
FIG. 1A illustrates an example computing device internal component stack with a low profile thermistor mounted in a flexible circuit to measure temperature away from a printed circuit board according to one aspect of the disclosure.

According to one aspect of the disclosure, illustrated in FIG. 1A, a thermal sensor is positioned on a flexible circuit located in close proximity to the enclosure or hot-spot to most accurately track and control skin temperature of the computing device. As illustrated in FIG. 1A, an electronic computing device 100 including an enclosure 101 or package may include a display stack 102 that provides a user display and touch screen for a user to interface with the computing device 100. The computing device may also include a PCB 104 within the enclosure 101 that has a plurality of electronic components, such as a processor component 106, mounted on a first surface of the PCB 104 and/or an electronic component 108, such as memory, mounted on a second surface of the PCB 104 (it should be appreciated also that the PCB may be single sided having components mounted on only one side). As described below, the electronic components may include one or more CPUs, memory devices, etc. One or more flexible circuits 110, 112 may be implemented to include one or more low profile thermistors 114, 116 specifically located to detect temperature(s) of the enclosure 101, such as with temperature sensor 116. Additionally, temperature proximate to components of interest or hot spots may be more accurately monitored by locating a low profile temperature sensor on a flexible circuit 112, such as sensor 114, configured to detect temperature of the display stack 102 with which the user interfaces.

Figure 1B:
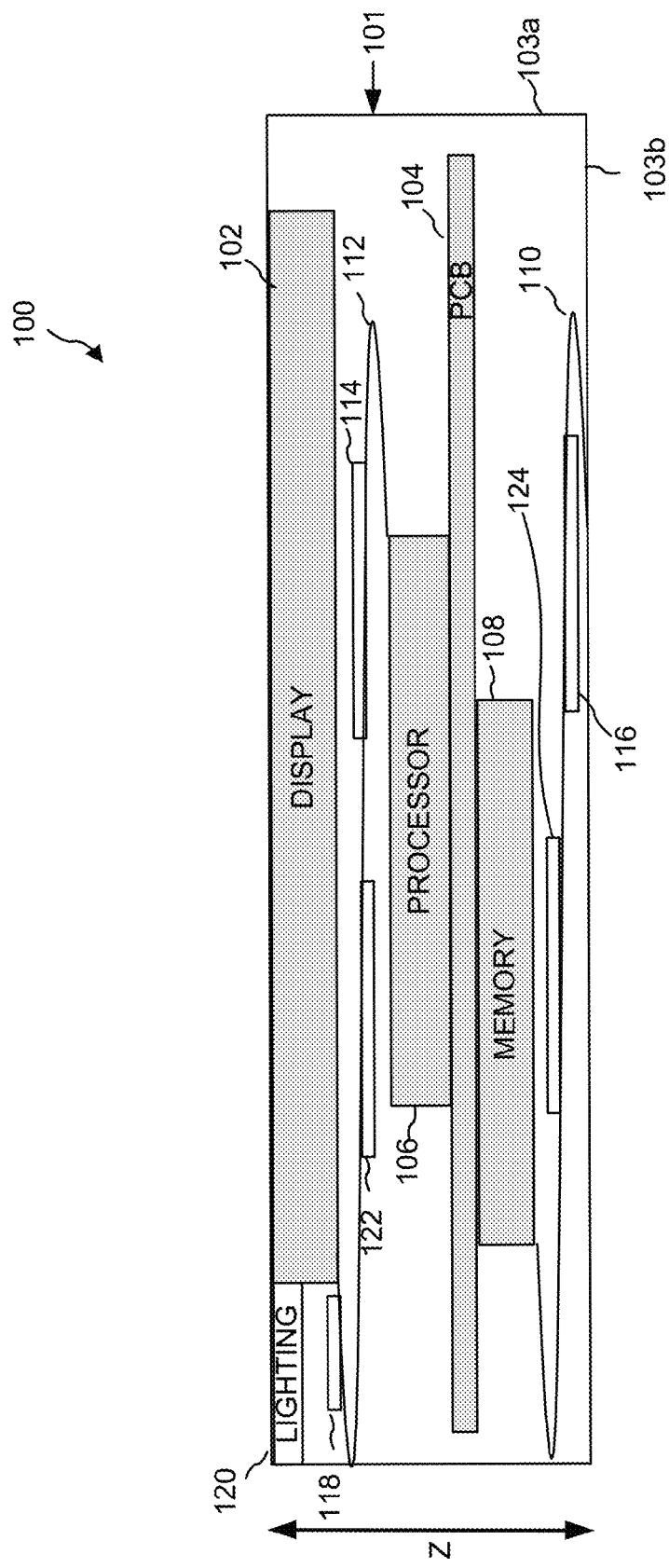
FIG. 1B illustrates an example computing device internal component stack with low profile thermistors mounted in a flexible circuit to measure other target temperatures away from a printed circuit board according to one aspect of the disclosure.

As illustrated in FIG. 1B, still other target temperatures may be monitored according to the disclosure, such as by mounting a low profile thermistor 118 on the flexible circuit 112 proximate to light source(s) 120. Similarly, temperature in close proximity to the processor 106 may be monitored by a low profile thermistor 122 on the flexible circuit 112, and/or temperature in close proximity to the memory 108 monitored by a low profile thermistor 124. A camera assembly 130 may also be of interest in terms of temperature monitoring, as it may have components (e.g. flash components) that may be monitored, such as by a low profile thermistor 132 mounted and electrically connected on flexible circuit 112.

Low profile thermistors with a thickness of between approximate 50 microns and 100 microns may be implemented on existing flexible circuits within an enclosure without increasing the z-height (illustrated in FIG. 1B) of the existing flexible circuits or taking up additional room within the enclosure 101. Stiffenable flexible circuits, which may be stiffened after placement, may be implemented, and low profile thermistors appropriately disposed thereon, in order to locate the thermistors in very close proximity to targets within the enclosure where accurate temperature sensing is highly desirable. For example, locating the thermistor on a flexible circuit between the PCB and very close to the inner surface of the enclosure will provide a more accurate reading of the surface temperature of the handheld computing device.

Figure 2:
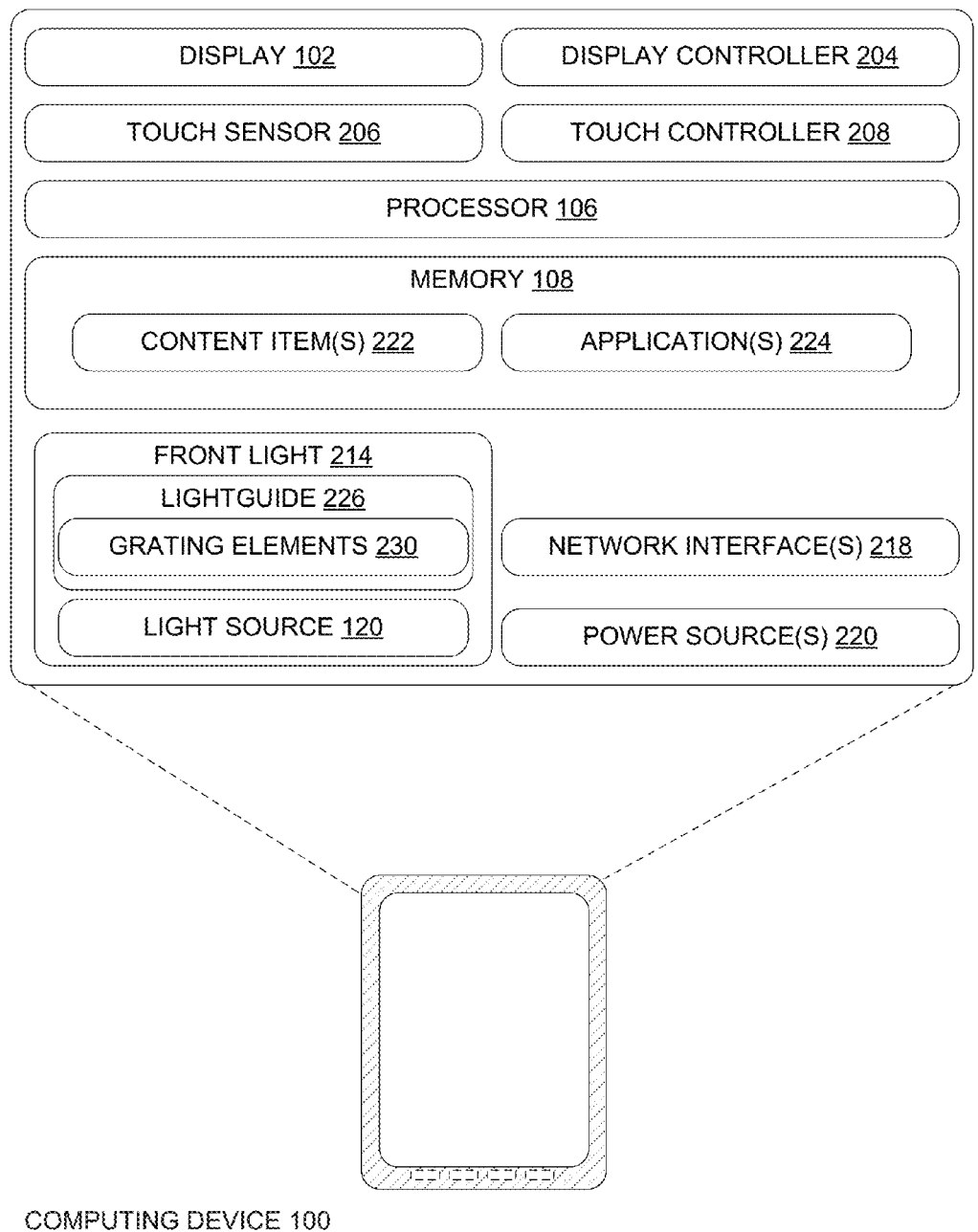
FIG. 2 illustrates an example computing device that includes a display, touch sensor atop the display, a front light and other components that facilitate user functionality of a computing device according to one aspect of the disclosure.

FIG. 2 illustrates the example computing device 100 that includes the display stack 102 and PCB 104 as introduced above. The device 100 may comprise any of various types of mobile electronic devices (e.g., an electronic book reader, a tablet computing device, a laptop computer, a multifunction communication device, a portable digital assistant (PDA), etc.). In addition, while FIG. 2 illustrates several example components of the device 100, it is to be appreciated that the device 100 may also include other conventional components, such as an operating system, system buses, input/output components, and the like, discussed below.

The computing device 100, may include the display 102 and a corresponding display controller 204. The display 102 may represent a reflective display in some instances, such as an electronic paper display, a reflective LCD display or the like Displays may be front-lit or back-lit.

Electronic paper displays represent an array of display technologies that mimic the look of ordinary ink on paper. In contrast to conventional backlit displays, electronic paper displays typically reflect light, much as does ordinary paper. In addition, electronic paper displays are often bi-stable, meaning that these displays are capable of holding text or other rendered images even when very little or no power is supplied to the display.

In one implementation, the display 102 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while these different examples have been given, it is to be appreciated that the reflective displays described herein may comprise any of various other types of electronic-paper technology or reflective-display technology, such as gyricon displays, electrofluidic displays, interferometric modulator displays, cholestric liquid crystal displays, and the like. In addition, while some of the examples described above are discussed as rendering black, white, and varying shades of gray, it is to be appreciated that the described techniques apply equally to reflective displays capable of rendering color pixels.

In addition to including the display 102, FIG. 2 illustrates that the device 100 may include a touch sensor 206 and a touch controller 208. In some instances, at least one touch sensor 206 resides atop the display 102 to form a touch-sensitive display (e.g., an electronic paper touch-sensitive display) that is capable of both accepting user input and rendering content corresponding to the input. As described in further detail below, the touch sensor 206 may reside atop a substrate (e.g., atop a glass substrate) of the display 102.

The touch sensor 206 may comprise a capacitive touch sensor, a force sensitive resistance (FSR), an interpolating force sensitive resistance (IFSR) sensor, or any of various other types of touch sensor. In some instances, the touch sensor 206 is capable of detecting touches as well as determining an amount of pressure or force of these touches. Extended touch screen involvement results in the potential for user's to perceive heat being generated within the device thus it is very important to accurately monitor skin temperature and any hot-spots within the device.

FIG. 2 further illustrates that the computing device 100 may include one or more processors 106 and memory 108, as well as a front light 214 (or back light) for lighting the display 102, an antiglare or top component 216 for reducing glare of incident light or providing other desired surface characteristics such as a hard-coat for scratch resistance, textured surface for desired tactile feel, or the like. The front light and/or back light may be part of a light assembly that includes one or more light sources, such as an LED component, that provides light to the display. The device may also include one or more network interfaces 218 and one or more power sources 220 (which, as well as display components, may be a source of heat for which more accurate temperature monitoring may be desirable). The network interfaces 218 may support both wired and wireless connection to various networks, such as cellular networks, radio, WiFi networks, short range networks (e.g., Bluetooth), infrared, and so forth.

Memory 108, which may include, but is not limited to, RAM, ROM, EEPROM, flash memory, or other memory technology, may be used to store any number of functional components that are executable on the processor(s) 210, including content items 222 and applications 224. Thus, memory 108 may include an operating system and a storage database to store one or more content items, such as eBooks, audio books, songs, videos, still images, and the like. The memory 108 of the computing device 100 may also store one or more content presentation applications to render content items on the device 100. These content presentation applications may be implemented as various applications depending upon the content items. For instance, the application may be an electronic book reader application for rendering textual electronic books, an audio player for playing audio books or songs, a video player for playing video, and so forth. The memory 108 may also store user-executable applications, or programs, for conducting various functions on the computing device 100. For example, the application in memory 108 may be configured according to aspects of the present disclosure to process or analyze temperature information sensed via the low profile sensors positioned within the enclosure, and apply or use that temperature information in a thermo-management scheme for the device.

With respect to lighting in an illustrative device 100, the amount of light emitted by the lighting 214 may vary. For instance, upon a user opening a cover of the device, the light from the front light may gradually increase to its full illumination. In some instances, the device 100 includes an ambient light sensor and the illumination of the front light 214 may be based at least in part on the amount of ambient light detected by the ambient light sensor. For instance, the front light 214 may be brighter if the ambient light sensor detects relatively little ambient light, and may be dimmer if the ambient light sensor detects a relatively large amount of ambient light. Portions of the enclosure near lighting may also be a source of heat targeted for accurate temperature sensing. Also as illustrated in FIG. 2, the light source 120 may comprise one or more (e.g., four) LEDs, which may reside toward a bottom edge of the computing device 100. Light sources may also be a source of heat, and monitored/controlled as a function of temperature sensed as described herein).

While FIG. 2 illustrates example components, the computing device 100 may have additional features or functionality. In addition, some or all of the functionality described as residing within the device 100 may reside remotely from the device 100 in some implementations. In these implementations, the device 100 may utilize the network interfaces 218 to communicate with and utilize this functionality.

Figure 3:
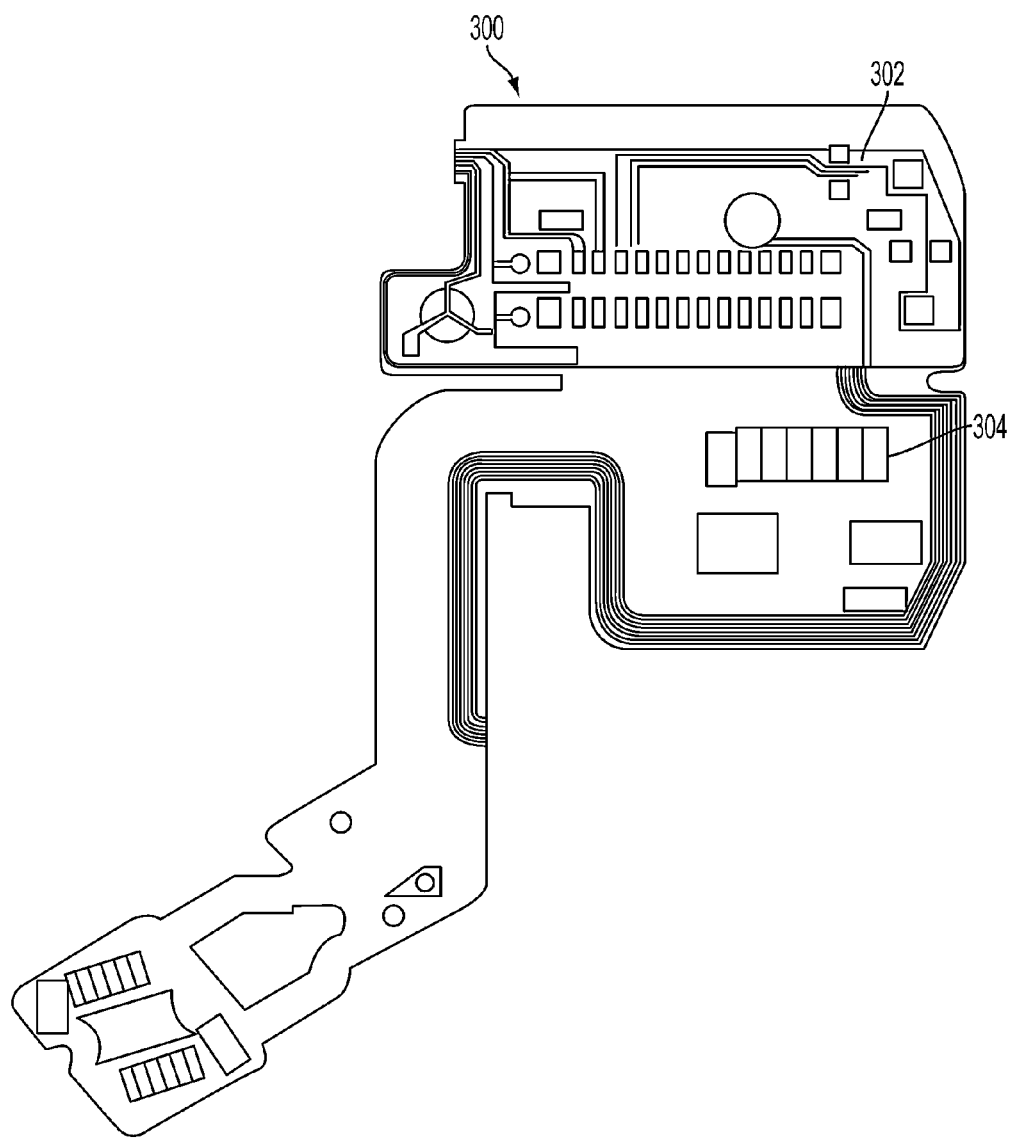
FIG. 3 illustrates a flexible circuit having a low profile thermistor mounted therein to measure temperature away from a printed circuit board according to one aspect of the disclosure.

FIG. 3 illustrates a flexible circuit 300 for mounting a thin film thermistor according to one aspect of the disclosure. There are typically several such flexible circuits or flexible cables (collectively and interchangeably referred to herein as "flexible circuits") within the computing device enclosure, and the present disclosure contemplates that one or more of the existing flexible circuits may be used to receive temperature sensing component(s) to more closely locate the temperature sensing component to the enclosure or temperature target of interest, thus substantially avoiding any increase in the density or z-height of components within the enclosure. The flexible circuit may be a single or double sided flexible circuit. A single-sided flexible circuit has patterns of conductors 302 etched on one side of a dielectric base film. A double-sided flexible circuit has etched conductor patterns on both sides (not shown) of the dielectric base film. Electrical conductivity between layers may be achieved via conductive through-holes or vias. The patterns of conductors may be used to supply power and signals to/from electronic components 304, such as thermistors as discussed herein, selectively located on the flexible circuit 300.

The temperature sensing devices selectively placed on the flexible circuit may be encapsulated in a dielectric, such as Polyimide (PI), Polyester (PET), Polyethylene Napthalate (PEN) or the like. Depending on the application, shielding may be added by implementing additional layers. Stiffeners and/or appropriate dimensional placement of devices, such as thermistors, may also be implemented in the flexible circuit in order to facilitate bending and placement of thermistor devices in very close proximity to the enclosure wall or target for more accurate temperature measurement. The enclosure wall is the edge of the enclosure which may also be the edge of the device. By placing a thermistor or other temperature sensor close to the wall of the enclosure (and thereby possibly the edge of the device), a temperature may be measured that corresponds to temperature sensed by a user. For example, thermistors may be selectively located, as with thermistor 116 in FIG. 1, so that the temperature sensor is not located near a heat-producing device or component, but is located proximate to the wall 103a of the enclosure 101 that will provide a clearer indication of the heat that may be perceived by a user holding the computing device. Further, stiffeners may be implemented in the flexible circuit so that the flexible circuit is configurable, such as by bending, to keep the low profile thermistor 116 (FIG. 1) in very close proximity to the wall 103a of the enclosure 101 to measure that skin temperature (i.e., the temperature of the wall of the enclosure). To measure the temperature at the wall of the enclosure, the thermistor may be placed near a side wall 103a of the enclosure 101, near a bottom interior wall 103b of the enclosure 101, or any appropriate wall. While the temperature at the wall of the enclosure may not be the exact temperature sensed by a user, a temperature reading from a thermistor at the wall of the enclosure provides a better sense of the user experienced temperature than a thermistor located elsewhere would provide.

Temperature sensing devices, such as low profile thermistor devices for use according to one aspect of the disclosure may include low profile devices that may be between about 50 to 100 microns in thickness. In one aspect of the disclosure, low profile thermistors such as available from Murata Manufacturing Co., Ltd, such as an ultra-thin model of Murata T0.15-0201-SMD having a profile thickness between 50 and 100 microns may be used. Leaded or surface mount devices may be applicable as a function of the location/application. Thermistors, or "thermal resistors" have resistance characteristics that remain flat or steady over a range of temperatures, such as room temperature, and the resistance increases exponentially beyond a point, as known to those skilled in the art. The temperature sensing capabilities may be used in conjunction with circuitry to provide overcurrent protection, current protection, temperature compensation, Integrated Circuit protection or other modes of protection to correct for temperatures outside of a desired point.

Figure 4:
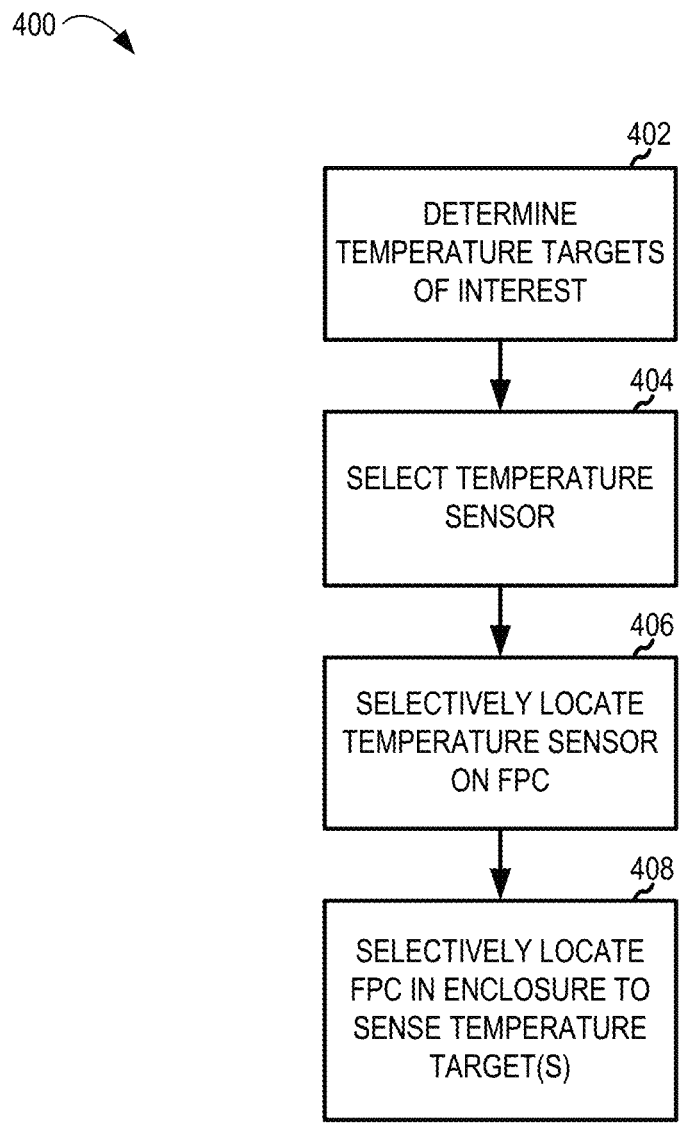
FIG. 4 illustrates an example flow diagram of assembling a computing device having a heat sensor mounted on a flexible circuit according to one aspect of the disclosure.

FIG. 4 illustrates an example flow diagram of a method 400 of assembling a computing device having a heat sensor mounted on a flex cable according to one aspect of the disclosure. In a first step, 402, targets of interest are determined for locating temperature sensors in close proximity. Some fore-knowledge of the heat profile of the computing device may be obtained by modeling, i.e. running temperature modeling software such as Modeling software packages known in the art may be used to locate potential hot spots in a device may include Mentor Graphics Flotherm 9.3 and Flotherm XT, available from Mentor Graphics Corporation, Wislonville, Oreg., U.S.A.; Ansys Icepak, available from ANSYS, Inc., Canonsburg, Pa., U.S.A.; COMSOL Multiphysics, Burlington, Mass., U.S.A.; and CD-adapco STAR-CCM+, available from CD-adapco, Melville, N.Y., U.S.A. Enclosure temperatures near the back of the computing device enclosure (case or package) may be an area of interest as that is the portion of the device where heat is most perceptible to a user. Further, it may be desirable to target CPU, memory, display/lighting, camera and/or other components for temperature sensing. A temperature sensor is selected, in a step 404, and in the illustrative embodiment the temperature sensor is a low profile thermistor. However, other temperature sensors may be selected as a function of the application/location and space available within the enclosure. The selected temperature sensor is selectively located, in a step 406, on a flexible circuit so that location corresponds with the temperature targets of interest when the flexible circuit is located in the computing device enclosure. The flexible circuit is selectively located in the enclosure, in a step 408 so that the temperature sensing device (s) is in close proximity to the temperature target(s). The temperature information may be used in a thermal management scheme for the device, as in step 410.

Figure 5:
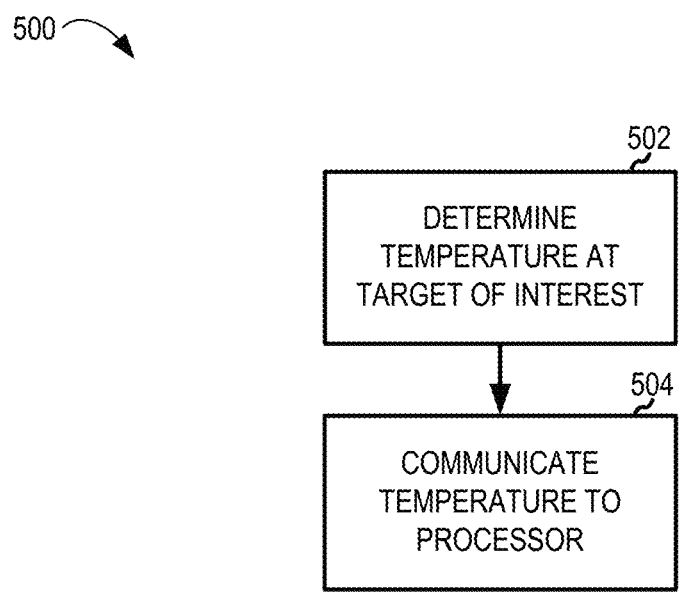
FIG. 5 illustrates an example flow diagram of sensing a temperature of a desired location within a device according to one aspect of the disclosure.

FIG. 5 illustrates an example flow diagram of a method 500 of sensing an internal temperature of a device according to one aspect of the disclosure. In a first step, 502, a temperature sensor, such as a thermistor located on a flexible circuit within an enclosure of a device, determines a temperature at a target of interest. The target of interest may be a heat generating electrical component (such as a memory, processor, display, light assembly, camera assembly, power source, etc.), a wall of the enclosure, or other target. In a second step, 504, the temperature sensor communicates the temperature to a processor of the device. The communication may involve sending a message from the temperature to the processor across an electrical connection disposed on the flexible circuit.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the temperature sensing described herein may be applied to many different target components or aspects of a handheld or other device. Additionally, temperature sensing devices other than thermistors may be implemented.

Persons having ordinary skill in the field of computing device, digital systems, and/or programming should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method or process, a system, or as an article of manufacture such as a memory device or nontransitory computer readable storage medium. For example, steps of selectively specifying and locating temperature sensing devices on flexible circuitry in close proximity to temperature targets may be implemented in software, firmware or the like as processing steps in conjunction with software modeling the heat characteristics of the computing device components and enclosure. The same may be done without including heat characteristic modeling. The computer readable storage medium may be readable by a computer and may comprise instructions for causing a computer or other device to perform some or all of the processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic device, comprising:
   an enclosure;
   a printed circuit board disposed within the enclosure;
   a processor disposed on the printed circuit board;
   at least one flexible circuit disposed within the enclosure, wherein the at least one flexible circuit is electrically connected to the processor;
   a first low profile thermistor disposed on the at least one flexible circuit, wherein the first low profile thermistor:
      is located in close proximity to a wall of the enclosure where heat generated within the enclosure is perceptible external to the electronic device, and
      is electrically connected to the processor to communicate a temperature at the wall of the enclosure; and
   a second low profile thermistor electrically connected on the at least one flexible circuit, wherein the second low profile thermistor is in close proximity to at least one of a camera assembly, a memory, or a display to sense temperature of at least one of the camera assembly, the memory, or the display.

2. The electronic device of claim 1, further comprising a display disposed near a top of the enclosure, and wherein: the at least one flexible circuit is positioned to electrically connect the processor to the display; and
   the at least one low profile thermistor is positioned on the at least one flexible circuit in a manner that does not impact a height of the enclosure between the display and a bottom of the enclosure.

3. The electronic device of claim 1, wherein the at least one low profile thermistor is disposed in close proximity to a bottom interior surface of the enclosure and between the bottom interior surface of the enclosure and an underside of the printed circuit board.

4. An electronic device, comprising:
   an enclosure;
   a printed circuit board disposed within the enclosure;
   a processor disposed on the printed circuit board;
   a memory disposed within the enclosure;
   a display disposed within the enclosure;
   a flexible circuit disposed within the enclosure; and
   a temperature sensor electrically connected to the processor, wherein the temperature sensor:
      is disposed on the flexible circuit, and
      is located within the enclosure proximate and disposed proximate to a bottom interior surface of the enclosure and between the bottom interior surface of the enclosure and an underside of the printed circuit board.

5. The electronic device of claim 4, wherein the temperature sensor is a low profile thermistor.

6. The electronic device of claim 4, wherein the temperature sensor has a height dimension of approximately 50 microns to 100 microns.

7. The electronic device of claim 4, further comprising:
   a camera assembly;
   a second flexible circuit; and
   a second temperature sensor electrically connected to the processor, wherein the second temperature sensor:
      is disposed on the second flexible circuit, and
      is located within the enclosure proximate to one of the camera assembly, the processor, the memory, the display, or a wall of the enclosure to sense temperature at the camera assembly, the processor, the memory, the display, or the wall of the enclosure.

8. The electronic device of claim 7, further comprising:
   a light assembly to provide illumination to the display; and
   a camera assembly.

9. The electronic device of claim 8, wherein the second temperature sensor is located within the enclosure proximate to one of the camera assembly, the processor, the memory, the display, or the light assembly to sense temperature at one of the camera assembly, the processor, the memory, the display, or the light assembly.

10. The electronic device of claim 7, further comprising a power source to provide power to at least one of the camera assembly, the processor, the memory, or the display.

11. The electronic device of claim 10, wherein the second temperature sensor is located within the enclosure proximate to the processor, the memory, the display, or the power source to sense temperature at one of the camera assembly, the processor, the memory, the display, or the power source.

12. A method comprising:
   detecting a first temperature at a first temperature target within an enclosure of a computing device, wherein the detecting is performed by a first temperature sensor disposed on a first flexible circuit;
   communicating the first temperature from the first temperature sensor to a processor of the computing device detecting a second temperature at a second temperature target within the enclosure of the computing device, wherein the detecting of the second temperature is performed by a second temperature sensor disposed on a second flexible circuit; and communicating the second temperature from the second temperature sensor to the processor of the computing device.

13. The method of claim 12, wherein the first temperature target comprises one of a camera assembly, power source, a processor, a memory, a display, a light assembly, or a wall of the enclosure.

14. The method of claim 12, wherein the first temperature sensor comprises a low profile thermistor.

15. The method of claim 14, wherein the low profile thermistor has a height dimension in a range of approximately 50 to 100 microns.

16. The method of claim 12, wherein the first temperature sensor is electrically connected to the processor across the flexible circuit.

17. The method of claim 12, wherein the first temperature sensor is disposed proximate to a bottom interior surface of the enclosure and between the bottom interior surface of the enclosure and an underside of a printed circuit board.

* * * * *